United States Patent [19]

Turcotte

[11] 4,034,218
[45] July 5, 1977

[54] FOCUSED DETECTION LOGGING TECHNIQUE

[75] Inventor: Ronald E. Turcotte, West Redding, Conn.

[73] Assignee: Schlumberger Technology Corporation, New York, N.Y.

[22] Filed: Oct. 9, 1975

[21] Appl. No.: 620,972

[52] U.S. Cl. .............................. 250/269; 250/253; 250/505

[51] Int. Cl.² .................................. G01V 5/00

[58] Field of Search .......... 250/253, 269, 358, 505, 250/510, 515

[56] References Cited

UNITED STATES PATENTS

| | | | |
|---|---|---|---|
| 2,727,155 | 12/1955 | Herzog | 250/269 |
| 2,997,586 | 8/1961 | Scherbatskoy | 250/358 |
| 3,197,638 | 7/1965 | Sinclair | 250/274 |
| 3,223,968 | 12/1965 | DeShazo | 250/269 |
| 3,373,286 | 3/1968 | Han | 250/358 |
| 3,407,300 | 10/1968 | Hansen | 250/505 |
| 3,509,341 | 4/1970 | Hindel et al. | 250/510 |
| 3,840,746 | 10/1974 | Kehler | 250/269 |
| 3,864,569 | 2/1975 | Tittman | 250/269 |

*Primary Examiner*—Harold A. Dixon

[57] ABSTRACT

In accordance with an illustrative embodiment of the present invention, a method and apparatus is disclosed for determining a characteristic of the media surrounding a borehole by emitting gamma radiation in at least one tightly collimated beam toward an earth formation adjacent a borehole, by detecting from a plurality of tightly collimated paths that are focused at a zone of intersection with and aligned to intersect with each emitted beam the gamma radiation scattered by the interaction of the emitted gamma radiation and the media at the zones of intersection, by misaligning the emitted beams and the tightly collimated paths to prevent their intersection, by detecting gamma radiation scattered by the interaction of the emitted gamma radiation and the media with the emitted beams and the tightly collimated paths misaligned and by determining from the detected gamma radiation a media characteristic. In one embodiment, the detection collimater used is formed of a material that is essentially opaque to gamma radiation at the energies of interest and includes a plurality of passageways that are spherically focused at a zone of intersection with one of the emitted beams of gamma radiation and that are arranged in a number of surfaces that are curved to be azimuthally symmetrical about the axis of the intersected beam.

7 Claims, 14 Drawing Figures

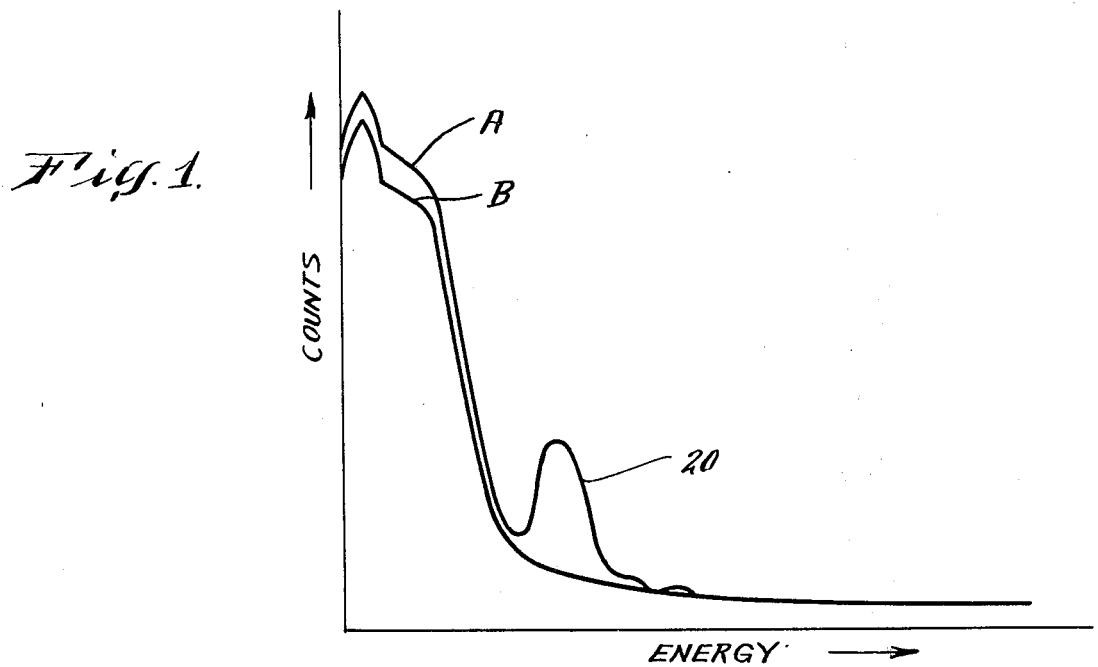
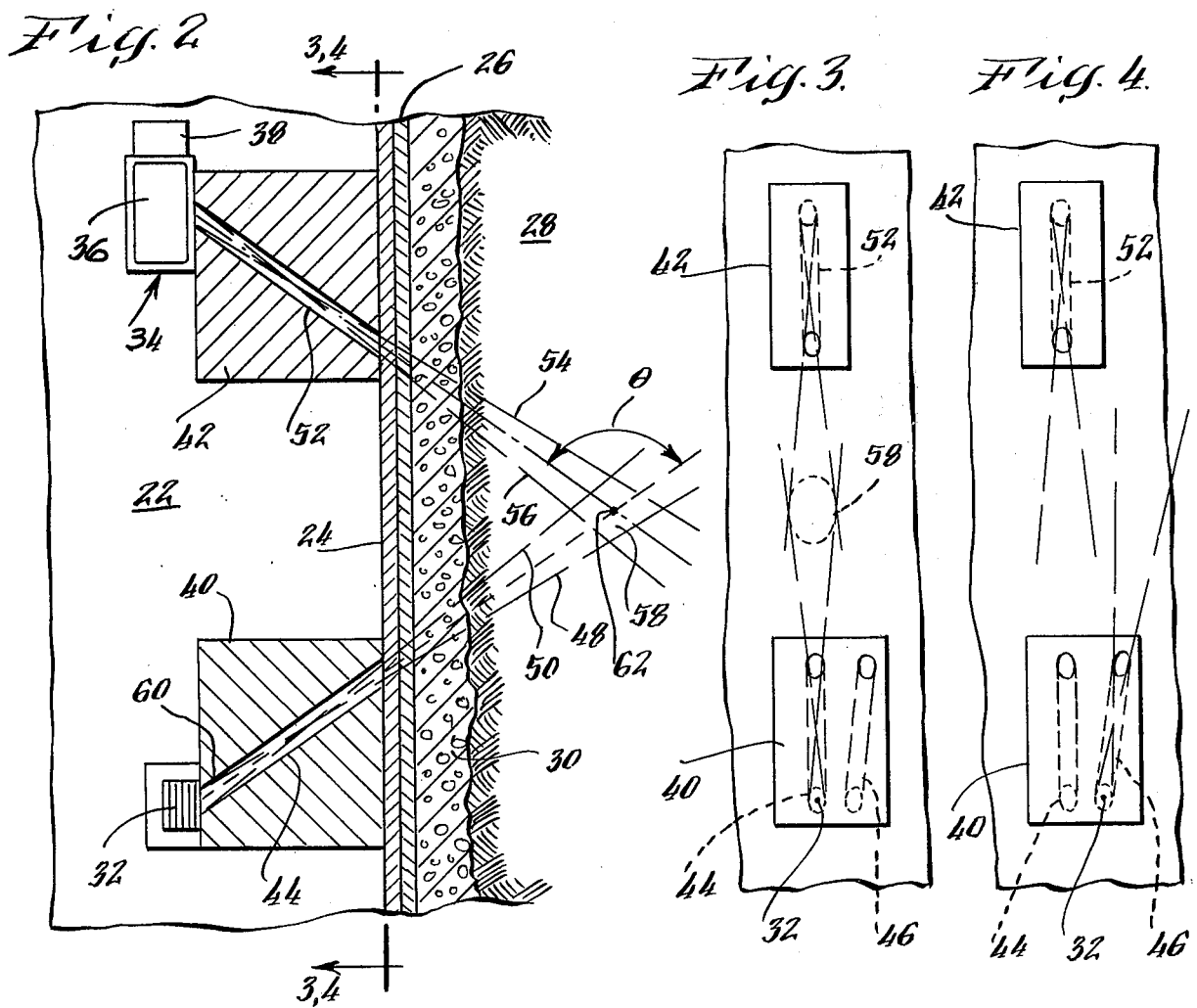

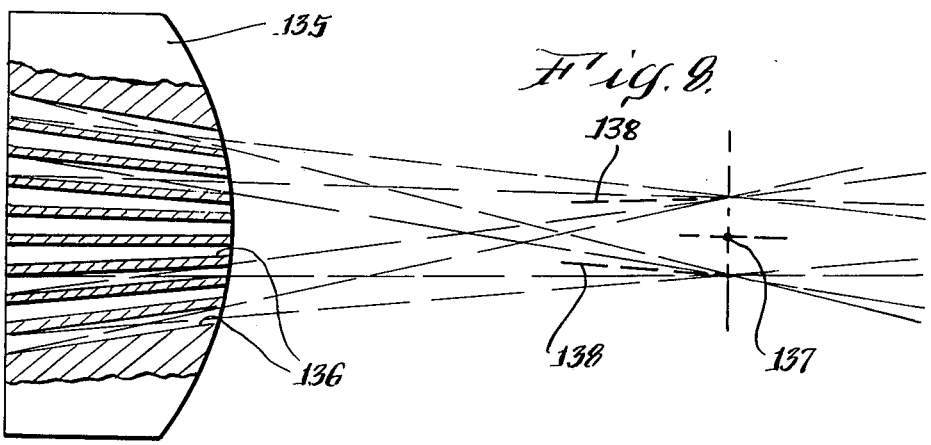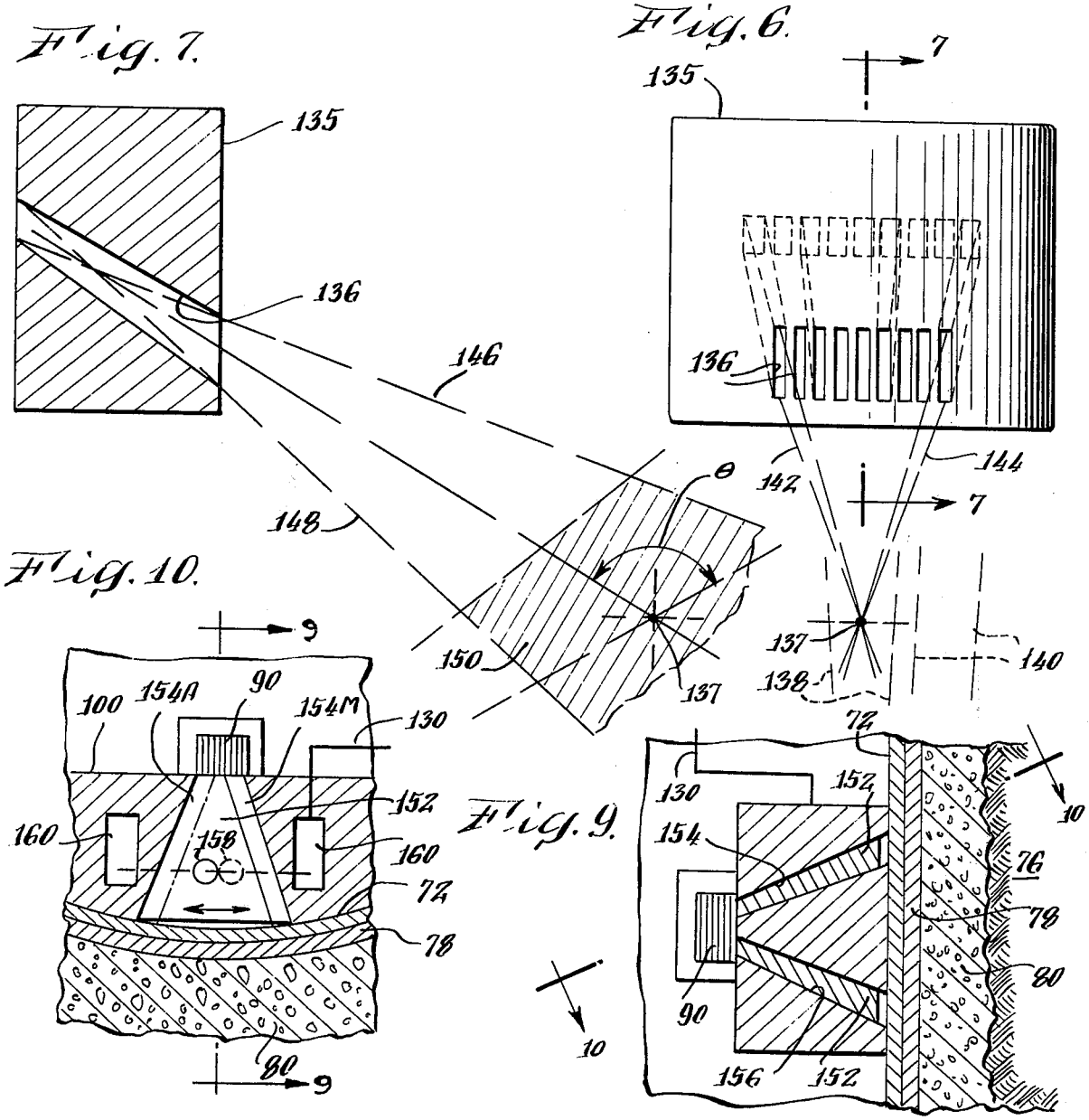

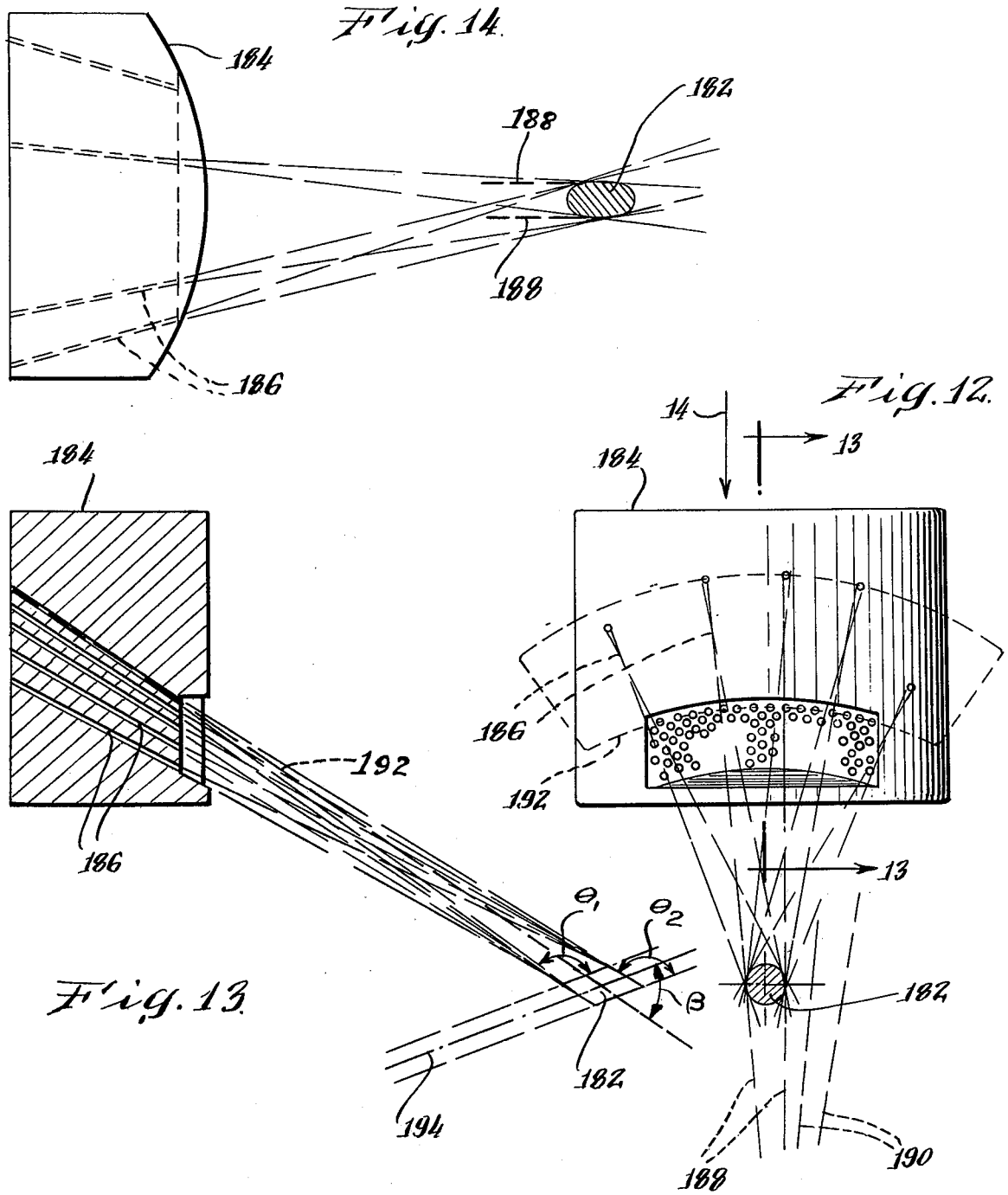

FOCUSED DETECTION LOGGING TECHNIQUE

BACKGROUND OF THE INVENTION

The present invention is concerned with improvements in borehole logging methods and apparatus, and, more specifically, a method of obtaining a log of a borehole with apparatus having at least one source of gamma radiation and at least one gamma radiation detector.

The usefulness of so called gamma-gamma well logging instruments for obtaining indications of earth formation density surrounding a borehole is well known, and the principles on which they operate are, similarly, well known to those skilled in the art. Generally, such density logging instruments take advantage of the Compton scattering effect, a phenomenon by which gamma radiation is scattered in an interaction with free or loosely bound electrons in the scattering medium. The gamma radiation scattering thus achieved can be measured in that when the energy of the incident gamma radiation is known, the energy of the gamma radiation that is Compton scattered at a particular angle with respect to the incident radiation can be calculated. Furthermore, the probability that a gamma ray will be scattered from a particular zone or volume of an earth formation is proportional to the number of electrons in the zone. The count rate of detected, singly scattered gamma radiation is, therefore, related to the density of the scattering zone.

Previously, attempts to measure the number of such singly scattered gamma rays that are scattered at a selected volume in an earth formation have produced collimation schemes to limit the emission and/or detection patterns for gamma radiation in the formation. Typical of these schemes are the techniques disclosed in the following U.S. Pat. Nos. 2,934,652; 3,202,822; 3,263,082; 3,321,627; 3,840,746; and 3,846,631. Such previous techniques, however, have failed to provide a collimation scheme with sufficient resolution capability to assure that the volume of interest was in fact the volume that produced the detected results. Furthermore, the prior art devices have, due to detection count rate considerations, had to consider such a large volume that sharp changes in density with depth have been difficult to detect. Moreover, background from multiply-scattered gamma radiation is a distorting problem that has largely been ignored by the prior art or dealt with in a comparatively inaccurate energy-discrimination scheme.

SUMMARY OF THE INVENTION

It is, therefore, an object of the present invention to provide a method and apparatus for more accurately determining a characteristic of the media surrounding a borehole through an improved determination of multiply scattered and other background gamma radiation.

It is a further object of the present invention to provide a method and apparatus for determining a characteristic of the media surrounding a borehole that has an improved collimation arrangement to obtain superior resolution of the formation characteristic determinations.

It is a still further object of the present invention to provide a method and apparatus for improving the detection collimation of gamma radiation emitted into the media surrounding a borehole scattered at a selected zone of the formation.

There is provided, therefore, in accordance with the present invention, a method and apparatus for logging a borehole in which gamma radiation is emitted into the media adjacent the borehole in at least one tightly collimated beam. Gamma radiation that is scattered by the interaction of the emitted radiation and the earth formation is detected from a plurality of tightly collimated paths that are focused to a zone or volume of intersection with and aligned to intersect with each emitted gamma radiation beam. Thereby, the spectrum of detected gamma radiation includes singly scattered gamma radiation produced by the interaction of emitted gamma radiation and the earth formation at the zone of intersection. The emitted beams and the tightly collimated paths are misaligned to prevent their intersection so that the spectrum of gamma radiation detected during misalignment excludes all singly scattered gamma radiation. From the spectra of gamma radiation detected when the emitted beams and collimated paths are both aligned and misaligned, it is then possible to determine a media characteristic such as, for example, density, in a well-defined volume of the media.

Detection of the scattered gamma radiation is limited by a collimator mounted in the well logging instrument between the borehole and the gamma radiation detector. The collimator is fabricated of a material that is opaque to gamma radiation and includes a number of passageways or collimation holes, each of which act as a path or guideway for gamma radiation. The cross-sectional area and length of each passageway is determined by the location and volume of the zone of intersection with the emitted beam in the media.

To improve the resolution of the characteristic determined when a stationary logging technique is used, the collimator may include a number of passageways the totality of which are spherically focused to intersect the zone of interest in the earth formation; i.e., the zone of interest is the focal point of the collimator. Since the beam of emitted gamma radiation also passes through the zone of interest in the earth formation, the count rate of detected gamma radiation may be enhanced without degrading the information content of the data by arranging the passageways to define a number of curved surfaces that pass through the zone of interest and that are curved to be azimuthally symmetrical about the axis of the beam of gamma radiation emitted into the earth formation.

As stated above, a more accurate media characteristic determination is obtained by accounting for background gamma radiation in the determination by detecting gamma radiation during a first period when the emitted beam and the focused detection path are aligned to intersect and during a second period when the beam and the focused paths are misaligned. The misalignment may be accomplished either by shifting the emitted beam and using a stationary detection collimator or, alternatively, by maintaining a stationary beam of emitted gamma radiation and shifting the focused paths to a zone adjacent the zone of intersection. Thereby, information is obtained that is specific to the gamma radiation background, and in combination with the information obtained when the beam and the paths are aligned, a more accurate characteristic may be obtained.

A perferred embodiment for density determination according to the present invention includes at least one source of gamma radiation and a pair of gamma radiation detectors. Gamma radiation emitted into the media is collimated into at least two tightly collimated beams, and each detector has associated therewith a collimator for collimation of the detector has associated therewith a collimator for collimation of the detected gamma radiation from one or the other of the emitted beams. Furthermore, the collimators and detectors are arranged within the logging instrument so that the zone of intersection of the beam and their respective focused collimators have different depths of investigation into the earth formation. Thereby, the aligned and misaligned signals obtained from each detector will be related to density at different depths from the borehole into the media and it will be possible to correct for casing and other borehole effects. By appropriate adjustment of the distance from the borehole of the zone of intersection with the shallowest depth of investigation, representations of the characteristics of the media surrounding the borehole, such as, for example, cement thickness, may be determined.

The logging instrument may also include means for classifying the detected gamma radiation according to energy ranges, means for storing the classified signals according to energy range and depth, and means for transmitting the classified signals to the surface. At the surface, in accordance with the system of the present invention, there is provided means for computing from the signals in each energy range and at each depth a media characteristic. The aforementioned storage and computation according to depth may also involve synchronization of the detecting cycle with the logging speed of the instrument so that the signals obtained from each detector will be at the same depth in the borehole, even though the individual detectors are spaced apart longitudinally in the logging instrument. Advantageously, recording means will be included so that the characteristic obtained may be recorded on a base that can be correlated with the depth of the logging instrument from the surface of the earth as it advances through the borehole.

BRIEF DESCRIPTION OF THE DRAWING

Further objects and advantages of the present invention will be apparent and a better understanding of the invention will be gained from a consideration of the following description of the preferred embodiments, taken in conjunction with the appended figures of the drawing, in which:

FIG. 1 is a graphical representation illustrating spectra of detected gamma radiation obtained in accordance with the present invention;

FIG. 2 is a representational view of a source and detector collimation arrangement for illustrating principles in accordance with the present invention;

FIGS. 3 and 4 are cross-sectional views of the arrangement of FIG. 2 taken in the direction of the arrows for illustrating a misalignment technique in accordance with the present invention;

FIG. 6 is a view from an earth formation of a collimator of the type shown in the logging instrument of FIG. 5 in accordance with the present invention;

FIG. 7 is a cross-sectional view of the collimator of FIG. 6;

FIG. 8 is a top view of the collimator of FIG. 6;

FIG. 9 is a partial, cross-sectional view of the gamma radiation beam collimator of the logging instrument of FIG. 5; and FIG. 10 is a partial, cross-sectional view of one form of misalignment apparatus for use with the collimator of FIG. 9;

FIG. 12 is a view from an earth formation of a collimator of the type shown in the logging instrument of FIG. 11 in accordance with the present invention;

FIG. 13 is a cross-sectional view of the collimator of FIG. 12; and

FIG. 14 is a top view of the collimator of FIG. 12.

DESCRIPTION OF THE PREFERRED EMBODIMENTS

Figure 5:
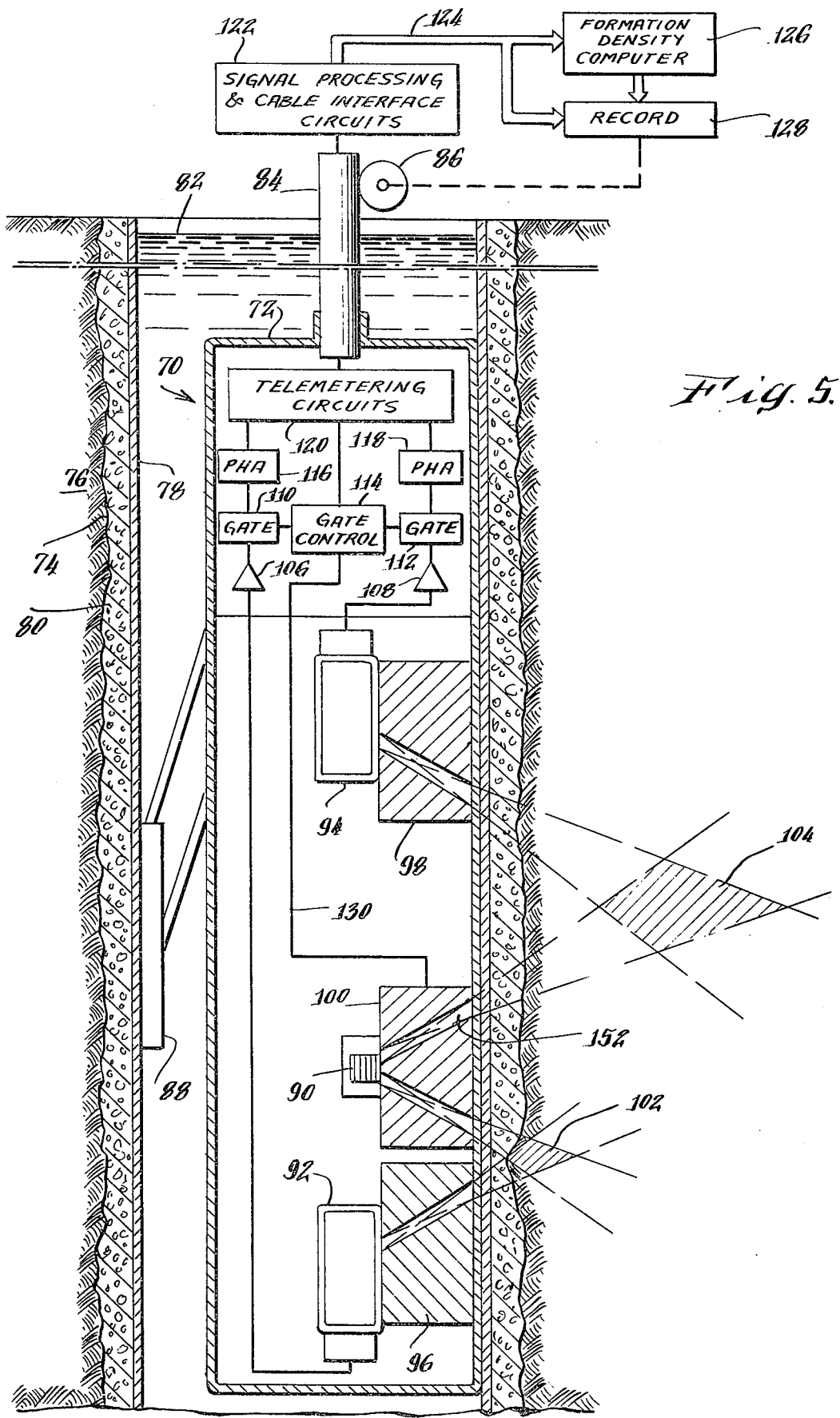
FIG. 5 is a cross-sectional representation of one embodiment of a logging instrument in a borehole in accordance with the present invention.

In the representative embodiments of the invention described hereinafter, a method and apparatus for logging a borehole is disclosed in which gamma radiation is emitted into an earth formation adjacent the borehole in at least one tightly collimated beam. Gamma radiation that is scattered by the interaction of the emitted radiation and the earth formation is detected from a plurality of tightly collimated paths that are focused at a zone or volume of intersection with each emitted gamma radiation beam. Thereby, the spectrum of detected gamma radiation includes singly scattered gamma radiation produced by the interaction of emitted gamma radiation and the earth formation at the zone of intersection. The emitted beams and the tightly collimated paths are misaligned to prevent their intersection so that the spectrum of gamma radiation detected during misalignment excludes all singly scattered gamma radiation. From the spectra of gamma radiation detected when the emitted beams and collimated paths are both intersecting and misaligned, it is then possible to determine a media characteristic, such as, for example, the density, in a well defined volume of the earth formation.

In the graphical representation shown in FIG. 1, curves A and B illustrate spectra of detected gamma radiation that may be obtained in accordance with the present invention. Curve A is representative of the spectrum of gamma radiation detected when the emission of radiation is limited to a well-defined beam by tight collimation, as hereinafter defined, and when the detected radiation is limited to the radiation traversing a plurality of tightly collimated paths that are focused at a zone of intersection with the emitted beam. By such careful collimation control of the emitted and detected gamma radiation, in accordance with the present invention, a significant number of the detected gamma radiation counts will consist of singly scattered gamma rays that (1) have been emitted from the source, (2) have undergone a single interaction with the media at the zone of intersection of the emitted beam and the plurality of paths, and (3) have been scattered back to the detection means. As a result, the spectrum of detected gamma radiation of Curve A exhibits a single scattering peak 20 at an energy that is well-defined and can be calculated as described hereinafter.

Curve B in FIG. 1 represents the spectrum of gamma radiation detected when the emitted beam and the plurality of paths are slightly misaligned, in accordance with the present invention, so that they do not intersect. As shown in FIG. 1, the single scattering peak 20 disappears due to the tight collimation. Therefore, by examining curves A and B in the region of the single scattering energy, it is possible to determine accurately a single scattering count rate, which is related to the density of the earth formation at the zone of intersection.

FIG. 2 shows in a partial, cross-sectional view a source and detector collimation arrangement that is representative of a portion of a logging instrument 22 in a borehole and that has been simplified considerably to assist in explaining the principles of the present invention. The instrument housing 24 is in contact with the borehole casing 26 and surrounding media, which may comprise, for example, earth formation 28 and a column or body of cement 30. The logging instrument 22 includes a gamma radiation source 32 and a gamma radiation detector arrangement 34 that are separated by an appropriate shield (not shown).

A number of gamma radiation sources are known that are suitable for use with apparatus of the present invention, such as, for example, a cobalt-60 or a cesium-137 chemical source. When considering a particular source, however, it is important to balance the need for a high detection count rate giving results that are statistically reliable with the requirement that the source selected have as monoenergetic a spectrum of emitted gamma radiation as obtainable so that, as will be explained further hereinafter, the detected peak of singly scattered gamma radiation will have the best resolution possible.

A variety of detector arrangements may be employed in accordance with the present invention, one suitable selection being the scintillation-type gamma radiation detector. Accordingly, FIG. 2 shows a gamma radiation sensitive crystal 36, such as sodium iodide, and, optically coupled thereto is a photomultiplier tube 38.

Also included within the instrument 22 are collimators 40 and 42 for limiting, respectively, the emission of gamma radiation to a well-defined beam and the detected gamma radiation to well-defined paths. Each collimator is formed of a material that is essentially opaque to gamma radiation at the energy of interest and may comprise any of the materials known to be effective in attenuating gamma radiation, such as lead, bismuth, mercury, tungsten alloy and the like.

The collimation principles, in accordance with the present invention, will now be described by reference to the simplified source and detector arrangement shown in FIG. 2 and the associated FIGS. 3 and 4. Gamma radiation emitted by source 32 is collimated by passageway 44 in collimator 40. To clarify the explanation of the present invention, collimator 40 has been shown with only one passageway 44 that is circular in transverse cross-section, although, as will be further explained hereinafter, more than one passageway will normally be included and the cross-sectional configuration may be other than circular. Directly behind the collimation hole or passageway 44 in FIG. 2 and shown in FIGS. 3 and 4 is a second source collimator passageway 46, which is used for misalignment purposes as will be explained further hereinafter. The outer limits of the resultant beam of emitted gamma radiation that enters the earth formation 28 and that is important, in accordance with the present invention, for single scattering purposes is represented by dashed lines 48 and 50.

The gamma radiation scattered by the earth formation and detected by detector arrangement 34 is similarly collimated, as shown in FIG. 2, by collimation hole or passageway 52. The effective detection volume for single scattering interactions of detector arrangement 34 is shown by dashed lines 54 and 56. By coordination of the diameter and length of the passageways 44 and 52, as will be further explained hereinafter, a volume 58 is defined that is remote from the borehole and is the volume common to the emitted gamma radiation beam and the detection path and will be referred to hereinafter as the common scattering volume (CSV). The CSV 58 is the volume from which a singly scattered gamma ray emitted by source 32 will be passed by collimator 42 and detected in detector arrangement 34.

For a single scattering interaction to be detected by detector arrangement 34 a gamma ray emitted by source 32, such as that represented by line 60 in FIG. 2, will pass within the beam of emitted gamma radiation and, upon reaching the CVS 58, be scattered at, for example, location 62 at an angle $\theta$ to pass through collimator passageway 52 to detector 34. As is well-known, the energy of the gamma ray that would be detected after undergoing such a single scattering interaction can be calculated according to the following relationship if the energy of the emitted gamma radiation and the angle $\theta$ are known:

$$E' = \frac{E}{1 + \frac{E}{.511}(1-\cos\theta)} \qquad (1)$$

where $E$ is the energy in MeV of the incident radiation and $E'$ is the energy of the scattered radiation, also in MeV.

To improve the detection of singly scattered gamma radiation relative to multiply scattered gamma radiation in accordance with the present invention, gamma radiation detected by detector 34 is, to the greatest extent possible, tightly collimated. Tight collimation for purposes of the present application may be defined as the specific angular divergence of lines 54, 56 that will result in the detection of a range of singly scattered gamma rays that is of the same order of magnitude or less than the energy resolution capability of the detector 34 at the energy of the singly scattered gamma ray. By reviewing the geometry of the arrangement represented in FIG. 2, it can be seen that a gamma ray emitted by source 32 may approach dashed lines 48, 50 as outer limits for a single scattering reaction that is detected in detector 34. Similarly, within the CSV 58 the single scattering interaction may approach lines 54, 56 as limits and still be detected by detector 34. Within the range of angular limitations defined by lines 48, 50, 54 and 56 is established a range of single scattering angles $\theta$, which by reference to equation 1 may be translated into a range of energy values for the detected singly scattered gamma rays given an emitted gamma ray of a particular energy. In accordance with the present invention, that range of energy values for the detected gamma radiation should be of the same order of magnitude or less than the energy resolution capability of the detector 34.

As shown in FIG. 2, the true angular divergence of passageways 44 and 52 is not simply an extension of the outer limits of the respective passageways but is defined by the crossing relationship of dashed lines 48, 50 and 54, 56, which relationship is established by the geometrical extremes of the respective passageways and consequently depends on the specific shape of the passageways employed. Although passageways 44 and 52 are shown in FIG. 2 as being circular in transverse cross-section, any desired cross-sectional shape may be used; for example, passageways 44 and 52 could be square or rectangular in cross-section, or they could be shaped as narrow slots. In turn, the volumetric shape of CSV 58 will be determined by the specific shape used for each of the passageways 44, 52. With that in mind, determination of the actual dimensions for passageways 44 and 52 to achieve tight collimation becomes dependent upon the parameters associated with a particular logging application, such as, for example, the diameter of the logging instrument, the type of gamma radiation detector, the type of gamma radiation source, the energy of the detected radiation, the shielding material, and the desired depth of investigation into the earth formation.

In order to gain a clearer understanding of the view of FIG. 2, reference is made to FIGS. 3 and 4, which show a view that is taken in the direction of the section lines shown in FIG. 2 and illustrates collimators 40 and 42 with their respective passageways and the gamma radiation source 32.

In FIG. 3, another view of the intersecting beam of gamma radiation emitted by source 32 and the restriction of the path or detection pattern for the detector by passageway 52 is shown as well as a view of the zone or volume of intersection, CSV 58. Also shown in FIG. 3 is the second passageway 46 in collimator 40, which is referred to above and is used to obtain the misalignment gamma radiation spectrum shown as curve B in FIG. 1. Passageway 46 is arranged in collimator 40 to diverge slightly from passageway 44 so that the limit of the single scattering beam defined by passageway 46 does not intersect with CSV 58, which is defined by passageways 44 and 52.

To obtain the misalignment spectrum curve B, the gamma radiation source 32 is actually or effectively shifted as described hereinafter, from its position at the end of collimator 44 to a position at the end of collimator 46. As shown in FIGS. 3 and 4, it is not possible for a singly scattered gamma ray to be emitted from source 32 and detected by detector arrangement 34 because of the tight collimation and the misalignment of the emitted beam and detection volume. In this manner, a reliable indication of the multiply scattered or background gamma radiation is obtained.

By subtracting the misaligned spectrum, B, from the aligned spectrum, A, a number is obtained that is proportional to the number of singly scattered gamma rays produced (that is, proportional to the density) in the common scattering volume. The density of the common scattering volume can then be determined by comparing that number to a set of calibrated values taken in identical borehole conditions and known formation densities.

Shifting of the gamma radiation source 32 between the alternative positions at the end of passageways 44 and 46 may be accomplished by any appropriate method, such as, for example, a solenoid-operated spring-return system that is synchronized with the detection system. Alternatively, it would be possible to provide two gamma radiation sources, one at the appropriate position at the end of each passageway, and incorporate within the logging instrument an appropriately synchronized unblanking mechanism, such as a rotating wheel, so that a beam of gamma radiation is emitted in an alternative fashion from the two passageways. A further technique will be discussed hereinafter in connection with FIGS. 9 and 10.

Shown in FIG. 5 is one form of well logging instrument that is suitable in accordance with the present invention for continuous logging operations to obtain more accurate density determinations of an earth formation surrounding a borehole than heretofore possible. Instrument 70 includes a fluid tight housing 72 adapted to be suspended in borehole 74 that traverses earth formation 76. The borehole may be either cased, as represented by casing 78 and cement annulus 80, or uncased, and it may be filled with a drilling mud or other fluid 82. Suspension and vertical movement of the housing 72 is controlled by an armored cable 84, which extends to the earth's surface and passes over a winch 86 provided with a commutating arrangement (not shown) allowing electrical signals to be transmitted between the instrument 70 and surface equipment. The housing 72 is urged against the casing by a conventional eccentering means, such as a bow spring or a spring-loaded hydraulic system 88.

The instrument 70 includes a radioactive isotope source 90, such as cobalt 60 or cesium 137 and two gamma radiation detector arrangements 92 and 94, which may be similar to the detector arrangement 34 shown in FIG. 2. Associated with each of the detector arrangements 92 and 94 is its respective detection collimator 96 and 98, which are similar in function to the detection collimators described hereinabove but have a slightly different configuration due to the low emission intensity of the chemical gamma radiation source and the continuous nature of the logging operation. Associated with the source 90 is a collimator 100, which is similar in function to the collimator 40 described in connection with FIGS. 2, 3 and 4.

As is well known, the use of two detectors for density determinations in so-called gamma-gamma logging operations is particularly advantageous. The "deep" detector provides information on the uninvaded or virgin earth formation and the "shallow" detector provides information on the borehole induced distortions in detected count rate. Accordingly, the "hollow" detector arrangement 92 is configured with respect to the source 90 so that CSV 102 is at the maximum distance, say 2½ inches, from the outside of instrument 70 to which variations in the thickness of mudcake or cement annulus 80 would be expected to occur. The deep detector arrangement 94 is configured so that CSV 104 is likely to be located in the virgin earth formations surrounding the borehole. Thereby, detector arrangement 94 can be used to provide the basic earth formation density determination and arrangement 92 can provide information necessary to correct the density so determined for variations in cement thickness and/or mudcake types and thicknesses as the instrument advances through the borehole. That correction may be accomplished since CSV 102 is at a depth at which most of the gamma radiation attenuation and detected count rate fluctuation is due to changing borehole conditions. In addition, count rate changes detected by arrangement 92 may be used to estimate cement thickness and, when an unusually thick cement annulus is encountered, an indication is obtained as to the possible unreliability of the density information obtained from the single scattering events detected.

Collimators 96 and 98 will be described hereinafter in greater detail in connection with FIGS. 6, 7 and 8.

However, their function is similar to the function described for collimator 42 shown in FIG. 2 and they differ, in accordance with the present invention, in the number and arrangement of passageways for detecting gamma radiation. Source collimator 100 is arranged to emit two beams of gamma radiation each of which is coordinated with one of the collimators 96, 98. As described hereinafter, the emitted beams and their respective detection paths can be aligned and misaligned to permit the recording of single-scattering and background gamma radiation information.

Each of the detector arrangements 92 and 94, which are advantageously small in size and efficient in operation, produces a signal representative of the energy of a detected gamma ray that is amplified, respectively, in preamps 106 and 108 and controlled by linear gates 110, 112 and gate control circuitry 114, as described hereinafter, in order to coordinate its detection period with the emission of the gamma radiation beam. After being passed by gates 110, 112, pulses from detectors 92, 94 are applied to pulse height analyzers (PHA) 116, 118, each of which measures the peak amplitude of each incoming pulse and outputs a digital number representative thereof. The digital outputs from PHA's 116, 118 are applied to telemetering circuits 120 where they are temporarily stored in a memory unit and are thereafter transmitted in a multiplexed fashion through armored cable 84 to the surface.

The apparatus and method employed in storing and transmitting the data to the surface may take the form of any of the various systems for telemetering well logging data that have previously been proposed, such as, for example, either the system described in U.S. Pat. No. 3,559,163, granted on Jan. 26, 1971 to R. J. Schwartz or, preferably, the system described in U.S. patent application Ser. No. 563,507 of W. B. Nelligan for System for Telemetering Well Logging Data, filed Mar. 31, 1975, both of which are assigned to the assignee of the present application.

At the earth's surface, the signals from PHA's 116, and 118 are amplified, decoded, and otherwise processed as needed in signal processing and cable interface circuits 122 for coupling over a conductor bundle 124 to a formation density computer 126, which processes information from the two detectors to obtain formation density as described above or as shown in either of U.S. Pat. Nos. 3,321,625, issued May 23, 1967 to Wahl and assigned to the assignee of the present application or, more recently, U.S. Pat. No. 3,590,228, issued June 29, 1971 to Burke and also assigned to the assignee of the present application. If desirable, the density computer output and/or the detector outputs may be recorded on tape recorder 128 for further processing at a location remote from the borehole.

In addition to minimizing the detection of background gamma radiation, linear gates 110, 112 may be used to coordinate the detection period of the individual detectors through the use of appropriate gate control circuitry 114, which, for example, may include a suitable clock mechanism either to open both gates simultaneously in a common detection period or to obtain time-dependent indications of gamma radiation returning to the borehole by sequencing the various detection periods to take into consideration, for example, the diffusion time of the gamma radiation that penetrates more deeply into the formation and is scattered back to the borehole.

In order to permit the accumulation of information in both the aligned and misaligned configurations, gate control circuitry 114 may also be used to produce a signal on conductor 130 for deflecting the beam of gamma radiation after each detection period so that the beam will alternate between the aligned and misaligned positions as described hereinafter. Suitably, that signal could also be used in telemetering circuits 120 for multiplexing the outputs of PHA's 116 and 118 into separate memory address locations as described in the above-identified Nelligan application so that the density computer 126 is able to process count rate information, obtained in both the aligned and misaligned condition, that is equivalent to the information represented by curves A and B in FIG. 1. Other telemetering control schemes are possible, for example, a simple flip-flop arrangement could be used downhole to shift the output of each detector 92 and 94 to one of the two PHA's depending upon whether the emitted gamma radiation beam is in the aligned or misaligned position.

If further simplification of the logging instrument is desired, it is possible to obtain the number proportional to the singly scattered gamma rays in the common scattering volume by applying the pulses from the detector arrangements 92, 94 to pulse height discrimination circuitry that is adjusted so that the only pulses passed are those within a relatively narrow energy band that includes the single scattering peak 20. The output of the discrimination circuitry is then applied to an up/down counter that is connected so that pulses counted during the aligned portion of each cycle count positively and pulses counted during the misaligned portion count negatively. The number left after each aligned/misaligned cycle will be proportional to the number of single scattering events occurring in the common scattering volume and will, therefore, be representative of the density of that volume.

FIGS. 6, 7 and 8 show three views of one form of detection collimator that is suitable for use in accordance with the present invention with the logging instrument shown in FIG. 5. In view of the low gamma ray emission intensity of the chemical source 90, the collimation holes or passageways in the direction collimators 96 and 98 as well as the source collimator 100, do not have a generally circular cross-section as with the collimators shown in FIGS. 2, 3 and 4, but are generally rectangular in cross-section and are much higher than they are wide to form relatively narrow slots. Thereby, each CSV 102, 104 represents a relatively narrow slice of the earth formation.

In FIG. 6, collimator 135 includes a plurality of passageways 136 that are rectangular in cross-section and represent a series of relatively narrow slots that are focused at point 137. The outer limits of the beam of emitted radiation in the aligned and misaligned configuration is shown by dashed lines 138 and 140 respectively. As indicated by lines 142, 144, the passageways 136 are each dimensioned so that they coordinate with the emitted beam at the focusing point 137.

Referring to FIG. 7, which is a cross-sectional view taken through collimator 135 as shown in FIG. 6, the vertical limits defined by passageway 136 are represented by dashed lines 146 and 148. The view of FIG. 7 corresponds to the orientation of the source and detector collimators shown in FIG. 5. In FIG. 7, shaded area 150 represents a portion of the CSV that is shaped similar to CSV 104 in FIG. 5. The rectangular cross-sectional configuration of passageway 136 results in a range of values for the single scattering angle θ that far exceeds that represented by the collimation scheme shown in FIG. 2 and that exceeds the resolution capability of the gamma radiation detector. The effect of such a large range of scattering angles is that the single scattering peak shown in Curve A in FIG. 1 will not be as prominent. For continuous logging purposes, however, that sacrifice is necessary in order to obtain a count rate that is high enough so that statistically reliable density determinations can be made. Collimator 135 may still be said to be tightly collimated, however, in that the width of the passageways 136 is sharply limited so that when the emitted beam of gamma radiation is misaligned, detection of singly scattered gamma rays will be impossible and the density of the earth formation at the CSV 150 will still be determinable from the recorded data. As discussed above, information on the background radiation may be recorded when the emitted beam and the detection paths are in a misaligned configuration as shown in FIG. 6, which is a view having the same orientation as the representation shown in FIG. 4.

One form of apparatus that is suitable for obtaining a misalignment of the emitted beam and the detected gamma radiation is the beam shifting apparatus shown in FIGS. 9 and 10. As described in connection with FIG. 4, beam misalignment may be accomplished in a number of ways. If separate collimation passageways are provided for the aligned and misaligned measurements, as shown generally in FIG. 4, it will be necessary to shift the source of gamma radiation from the opening of one collimator hole to the other as the logging instrument is advanced through the borehole. In order to avoid the possibility of mechanical damage to the source 90, an arrangement preferable to such mechanical shifting is shown in FIG. 8, which is a view taken of the source and source collimator 100 similar to the view in FIG. 5. Misalignment of the detection paths and the emitted gamma radiation beam may best be accomplished by including within source collimator 100 a shifting block 152 for each passageway 154 and 156. By pinning each block 152 through its centroid, as shown in FIG. 10 at 158, any appropriate pneumatic, hydraulic or electro-mechanical means 160 may be used to shift the block as shown by the arrows in FIG. 10 to alternatively open and close passageways 154A (aligned) and 154M (misaligned), thereby aligning and misaligning the beam of gamma radiation emitted from source 90. Such shifting may be done at a constant frequency as the instrument is advanced through the borehole or may be at a variable rate that is controlled by gate control circuitry 114 through a signal on conductor 130.

In operation, gamma radiation is continuously being emitted by source 90 as the logging instrument is advanced through borehole 74. Shifting blocks 152 are alternated so that each of the emitted beams of gamma radiation sequence between being aligned and misaligned with respect to the tightly collimated detection paths defined by collimators 154 and 156. During each of the aligned and misaligned periods gamma radiation is (1) detected by each of the arrangments 92, 94, (2) classified according to energy by PHA's 116, 118 and (3) transmitted to the surface. The aligned and misaligned count rate information is then used as described hereinbefore to determine a density for the earth formation that is corrected for borehole effects. If a simple up/down counting technique is used, as described above, it will be necessary to transmit to the surface only the number obtained after each align/misalign cycle, which can then be used to determine the density of the earth formation.

Figure 11:
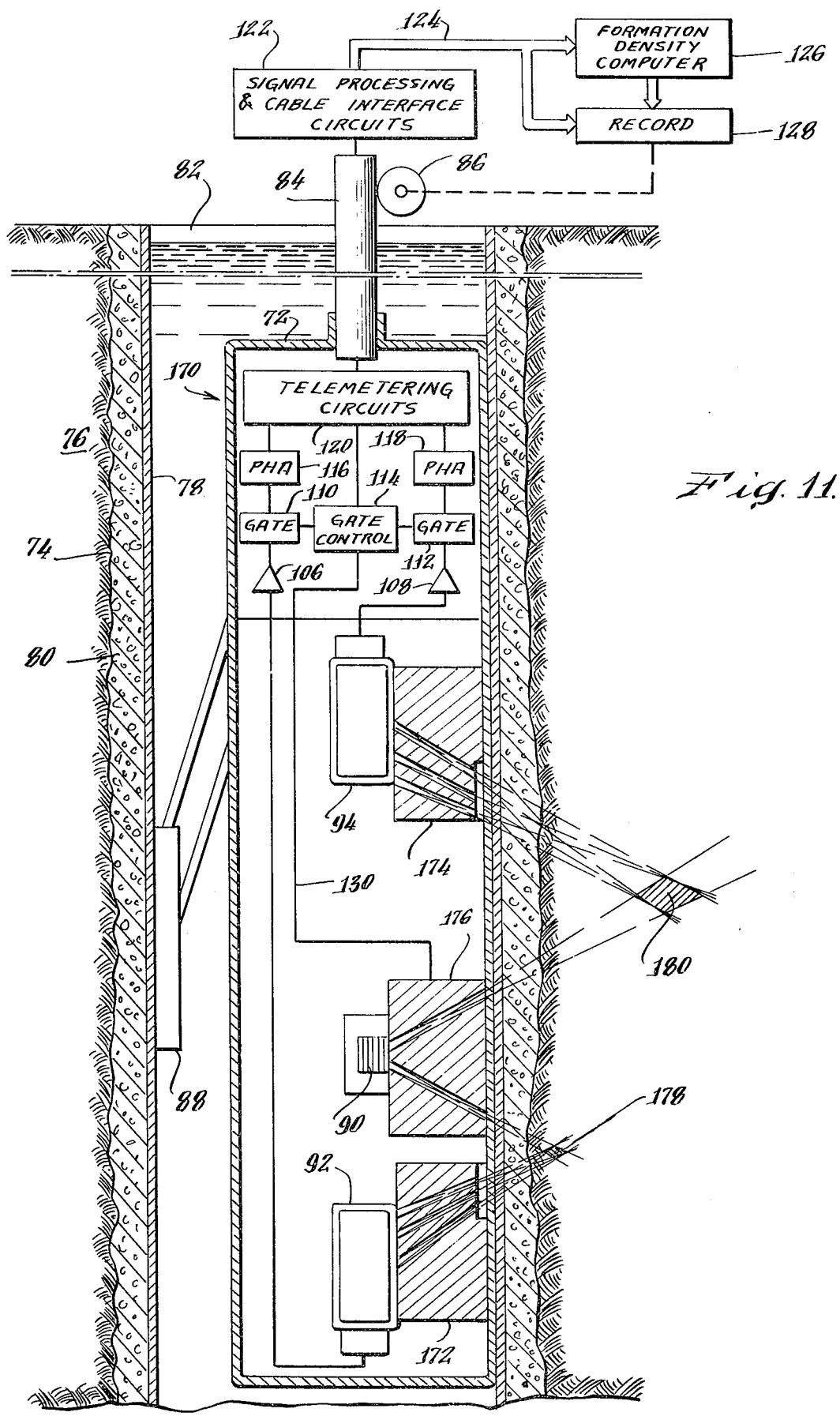
FIG. 11 is a cross-sectional representation of another embodiment of a logging instrument in a borehole in accordance with the present invention.

Shown in FIG. 11 is another embodiment of a well logging instrument that is suitable in accordance with the present invention for obtaining more accurate density determinations of an earth formation surrounding a borehole, particularly if stationary logging techniques are used. At the surface and within instrument 170, many of the components may be identical to the components identified in connection with the description of the embodiment shown in FIG. 5, and, accordingly, they have been given the same reference numerals in order to simplify the description of the embodiment of FIG. 11.

The instrument 170 includes a radioactive isotope source 90 and two gamma radiation detector arrangements 92 and 94, which may be the same as the source and detectors used in the embodiment shown in FIG. 5. Associated with each of the detector arrangements 92 and 94 is its respective detection collimator 172 and 174, which are similar in function to the detection collimators described above but have a slightly different configuration as a result of the stationary logging application. In general, each of the collimators 172 and 174, which will be described in greater detail in connection with FIGS. 12, 13 and 14, include a plurality of passageways that are significantly smaller in cross-sectional area than the slots included in collimators 96, 98 and 135. Source collimator 176 is similar to collimator 100, shown in FIG. 5, except that the passageways for emission of a beam of gamma radiation are, as with the detection collimators 172, 174, significantly smaller in cross sectional area.

As with the embodiment shown in FIG. 5, each of the detector/collimator arrangements has associated therewith a preamplifier, linear gate and PHA for producing digital outputs representative of the peak amplitude of each of the detected gamma ray pulses. The output from each of the PHA's are applied to telemetering circuits 116 and thereafter transmitted to the surface.

Similar to the embodiment shown in FIG. 5, two gamma radiation detector arrangements are provided to give an indication of density variations of different distances from the casing into the earth formation. In view of the stationary logging application, the collimation holes or passageways in the direction collimators 172 and 174 as well as the source collimator 176 have been changed in shape to improve the resolution and accuracy of the density determinations made. In place of passageways with a generally rectangular cross-section, the embodiment shown in FIG. 11 will preferably include collimator passageways with a generally circular cross-section and that are significantly smaller cross-sectional area. Thereby, each of the CSV's 178 and 180 are much smaller in volume than the CSV's 102, 104 shown in FIG. 5.

For a clearer explanation of the collimation technique used in the embodiment shown in FIG. 11, reference is made to FIGS. 12, 13 and 14, which show three views of one form of detection collimator that is suitable for use in accordance with the present invention with the logging instrument shown in FIG. 11.

Each of the figures includes a shaded area 182 representative of the CSV of the illustrated detection collimator 184 and a source collimator (not shown). Collimator 184 includes a plurality of collimation holes or passageways 186 with a length and diameter that are determined as described above. As can be seen by referring to the lines defining the detection volume for selected ones of the passageways 186, CSV 182 is the focal point of all of the passageways 186. The limits of the beam of emitted gamma radiation that is sufficient for single scattering purposes is shown in FIGS. 12 and 14 by dashed lines 188. In FIG. 12, both the aligned and misaligned beams are represented in a view with the same orientation as the representation shown in FIG. 4, the limits of the misaligned beam being shown by dashed lines 190.

For the collimator illustrated in FIGS. 12, 13 and 14, th single scattering angle $\theta$ may vary between the angle $\theta_1$ and $\theta_2$, shown generally in FIG. 13. As described above, the range of angles $\theta_1$ to $\theta_2$ is coordinated with the energy resolution capability of the detector arrangements 92, 94 so that the gamma radiation may be said to be tightly collimated.

In order to further improve the results achieved in accordance with the present invention, the plurality of passageways 186 are arranged to define a number of curved surfaces, for example, surface 192 shown in FIGS. 12 and 13, that pass through the CSV 182 and that are curved to be azimuthally symmetrical about the beam axis 194, shown in FIG. 13. Such a planar arrangement of passageways 186 is desirable since for any given scattering angle $\theta$ the probability of a scattering in a particular azimuthal direction is symmetrical with respect to the direction of the incident gamma ray. Therefore, each of the curved surfaces 192 are oriented at a different angle $\beta$, shown in FIG. 13, with respect to the beam axis 194 and may be thought of as a portion of a cone with the CSV at its apex.

In operation, the embodiment of the logging instrument shown in FIG. 11 is similar to the operation of the embodiment shown in FIG. 5 except that the resolution and accuracy of the density determinations is significantly improved by virtue of the use of collimation passageways of smaller size. Processing of the information to obtain density is done, however, in the same manner. Although the passageways 186 are shown in FIGS. 12, 13 and 14 as being circular in cross-section, any cross sectional shape that simplifies the collimator fabrication is permissible.

Shifting of the gamma radiation beam from the aligned and misaligned orientation for the embodiment shown in FIG. 11 may be by the same technique described in connection with the logging instrument 70, shown in FIG. 5.

Although the invention has been described with reference to specific embodiments thereof, many other variations and modifications of the invention will be apparent to those skilled in the art without departing from the spirit and scope of the invention. For example, a standard depth memorizer may be used with the surface processing equipment or the density computer can be appropriately programmed so that the signals used for density computations will have been obtained at the same depth in the borehole, even though the individual detectors are spaced apart longitudinally in the logging instrument. Furthermore, the collimation principles disclosed herein may be used with other sources of gamma radiation, such as, for example, the electron linear accelerator source disclosed in U.S. patent application Ser. No. 580,071 of Turcotte et al, filed May 22, 1975 and assigned to the assignee of the present application.

The above described embodiments are, therefore, intended to be merely exemplary, and all such variations and modifications are intended to be included within the scope of the invention as defined in the appended claims.

I claim:
1. A well logging method comprising the steps of:
   a. emitting from a given location gamma radiation in at least one tightly collimated beam toward the media surrounding a borehole;
   b. detecting at a predetermined distance from said location gamma radiation that is tightly collimated to a plurality of paths focused to a zone of intersection with and aligned to intersect with said emitted gamma radiation beam so that the radiation detected includes singly scattered gamma radiation produced by the intersection of emitted gamma radiation and the media at said zone of intersection;
   c. misaligning the beam emitted from said location and the tightly collimated paths to prevent their intersection;
   d. detecting at said predetermined distance, with the emitted beam and the tightly collimated paths misaligned, principally gamma radiation multiply scattered by the interaction of the emitted gamma radiation and the media; and
   e. subtracting the gamma radiation detected during misalignment from the gamma radiation detected during alignment to obtain a measurement of said singly scattered gamma radiation which is related to a density characteristic of the media at the zone of intersection.

2. A method of well logging using at least one source emitting gamma radiation and at least one gamma radiation detector located at a predetermined distance from the source comprising the steps of:
   a. tightly collimating the gamma radiation emitted by said source to at least one beam directed toward the media adjacent a borehole;
   b. tightly collimating the gamma radiation detected by said detector to a plurality of paths focused to a zone of intersection with and aligned to intersect with said emitted gamma radiation beam so that the spectrum of gamma radiation detected includes singly scattered gamma radiation produced by the interaction of emitted gamma radiation and the media at the zone of intersection;
   c. misaligning the beam emitted by said source and the tightly collimated paths to prevent their intersection so that the radiation detected by said detector is principally gamma radiation multiply scattered by the interaction of the emitted gamma radiation and the media; and
   d. subtracting the gamma radiation detected during misalignment from the gamma radiation detected during alignment to obtain a measurement of said singly scattered gamma radiation which is related to a density characteristic of the media at the zone of intersection.

3. A method of well logging using at least one source emitting gamma radiation and at least one gamma radiation detector located at a predetermined distance from the source comprising the steps of:
   a. tightly collimating the gamma radiation emitted by said source to at least one beam directed toward the media adjacent a borehole;

b. tightly collimating the gamma radiation detected by said detector to a plurality of paths that are (1) spherically focused to a zone of intersection with and aligned to intersect with said beam and (2) azimuthally symmetrical about the beam axis so that the spectrum of gamma radiation detected includes singly scattered gamma radiation produced by the interaction of emitted gamma radiation and the media at said zone of intersection;

c. misaligning the beam emitted by said source and the tightly collimated paths to prevent their intersection so that the radiation detected by said detector is principally gamma radiation multiply scattered by the interaction of the emitted gamma radiation and the media; and d. subtracting the gamma radiation detecting during misalignment from the gamma radiation detected during alignment to obtain a measurement of said singly scattered gamma radiation which is related to a density characteristic of the media at the zone of intersection.

4. A method of well logging using at least one source emitting gamma radiation and at least one gamma radiation detector comprising the steps of:

a. tightly collimating the emitted gamma radiation to a first beam directed toward the media adjacent a borehole;

b. tightly collimating the detected gamma radiation to a plurality of paths that are focused to a zone of intersection with and aligned to intersect with the first beam so that the spectrum of gamma radiation detected includes singly scattered gamma radiation produced by the interaction of emitted gamma radiation and the media at the zone of intersection;

c. tightly collimating the emitted gamma radiation to a second beam directed toward an earth formation adjacent a borehole;

d. tightly collimating the detected gamma radiation to a plurality of paths that are focused to a zone of intersection with and aligned to intersect with the second beam so that the spectrum of gamma radiation detected includes singly scattered gamma radiation produced by the interaction of emitted gamma radiation and the media at the zone of intersection;

e. misaligning the first and second beams and their respective focused detection paths to prevent their intersection so that the radiation detected is background gamma radiation; and f. determining from the aligned gamma radiation and the misaligned gamma radiation a density characteristic of the media.

5. An apparatus for logging a borehole to determine a characteristic of the media surrounding the borehole, the apparatus having at least one source emitting gamma radiation and at least one gamma radiation detector located at a predetermined distance from the source, comprising:

a. means for tightly collimating the gamma radiation emitted by said source to at least one beam directed toward the media adjacent a borehole;

b. means for tightly collimating the gamma radiation detected by said detector to a plurality of paths focused to a zone of intersection with and aligned to intersect with said emitted gamma radiation beam so that the spectrum of gamma radiation detected includes singly scattered gamma radiation produced by the interaction of emitted gamma radiation and the media at the zone of intersection;

c. means for misaligning the beam emitted by said source and the tightly collimated paths to prevent their intersection so that the radiation detected by said detector is principally gamma radiation multiply scattered by the intersection of the emitted gamma radiation and the media; and d. means for subtracting the gamma radiation detected during misalignment from the gamma radiation detected during alignment to obtain a measurement of said singly scattered gamma radiation which is related to a density characteristic of the media at the zone of intersection.

6. An apparatus for logging a borehole to determine a characteristic of the media surrounding the borehole, the apparatus having at least one source emitting gamma radiation and at least one gamma radiation detector located at a predetermined distance from the source, comprising:

a. means for tightly collimating the gamma radiation emitted by said source to at least one beam directed toward the media adjacent a borehole;

b. means for tightly collimating the gamma radiation detected by said detector to a plurality of paths that are (1) spherically focused to a zone of intersection with and aligned to intersect with said beam and (2) azimuthally symmetrical about the beam axis so that the spectrum of gamma radiation detected includes signly scattered gamma radiation produced by the interaction of emitted gamma radiation and the media at said zone of intersection;

c. means for misaligning the beam emitted by said source and the tightly collimated paths to prevent their intersection so that the radiation detected by said detector is principally gamma radiation multiply scattered by the interaction of the emitted gamma radiation and the media; and d. means for subtracting the gamma radiation detected during misalignment from the gamma radiation detecting during alignment to obtain a measurement of said singly scattered gamma radiation which is related to a density characteristic of the media at the zone of intersection.

7. An apparatus for logging a borehole to determine a characteristic of the media surrounding the borehole, the apparatus having at least one source emitting gamma radiation and at least one gamma radiation detector, comprising:

a. means for tightly collimating the emitted gamma radiation to a first beam directed toward the media adjacent a borehole;

b. means for tightly collimating the detected gamma radiation to a plurality of paths that are focused to a zone of intersection with and aligned to intersect with the first beam so that the spectrum of gamma radiation detected includes singly scattered gamma radiation produced by the interaction of emitted gamma radiation and the media at the zone of intersection;

c. means for tightly collimating the emitted gamma radiation to a second beam directed toward an earth formation adjacent a borehole;

d. means for tightly collimating the detected gamma radiation to a plurality of paths that are focused to a zone of intersection with an aligned to intersect with the second beam so that the spectrum of gamma radiation detected includes singly scattered gamma radiation produced by the interaction of emmitted gamma radiation and the media at the zone of intersection;

e. means for misaligning the first and second beams and their respective focused detection paths to prevent their intersection so that the radiation detected is background gamma radiation; and f. means for determining from the aligned gamma radiation and the misaligned gamma radiation a density characteristic of the media.

* * * * *